(12) United States Patent
Huisman

(10) Patent No.: US 10,677,516 B2
(45) Date of Patent: Jun. 9, 2020

(54) ADAPTER FOR A COOLER ASSEMBLY

(71) Applicant: Huismaneering LLC, Center Point, IA (US)

(72) Inventor: Jeremy Huisman, Center Point, IA (US)

(73) Assignee: HUISMANEERING LLC, Center Point, IA (US)

( * ) Notice: Subject to any disclaimer, the term of this patent is extended or adjusted under 35 U.S.C. 154(b) by 0 days.

(21) Appl. No.: 15/957,067

(22) Filed: Apr. 19, 2018

(65) Prior Publication Data

US 2018/0335247 A1   Nov. 22, 2018

Related U.S. Application Data

(60) Provisional application No. 62/507,851, filed on May 18, 2017.

(51) Int. Cl.

| F25D 23/06 | (2006.01) |
| F25D 31/00 | (2006.01) |
| A47J 41/00 | (2006.01) |
| B65D 81/38 | (2006.01) |
| B65D 21/08 | (2006.01) |

(52) U.S. Cl.
CPC .......... *F25D 23/06* (2013.01); *A47J 41/0061* (2013.01); *B65D 21/083* (2013.01); *B65D 81/3876* (2013.01); *F25D 31/007* (2013.01); *F25D 2500/02* (2013.01)

(58) Field of Classification Search
CPC ... F25D 3/08; F25D 3/06; F25D 23/06; F25D 31/007; F25D 31/006; F25D 31/00; A47J 41/0061; A47J 41/0055; B65D 81/3876; B65D 81/38; B65D 21/083; B65D 21/08; A61J 1/165; A61J 1/16
USPC .......... 220/592.16, 739, 737, 903, 8; 62/907
See application file for complete search history.

(56) References Cited

U.S. PATENT DOCUMENTS

| 1,434,460 | A | * | 11/1922 | Tibbatts | ............ A61J 9/00 220/4.26 |
| 4,517,815 | A | * | 5/1985 | Basso | ............ F25D 3/08 220/4.26 |
| 4,778,068 | A | * | 10/1988 | Kohus | ............ A61J 9/00 215/11.1 |
| 4,852,757 | A | * | 8/1989 | Gold | ............ B65D 21/083 220/4.03 |
| 5,272,890 | A | * | 12/1993 | Penxa | ............ F25D 3/08 220/23.83 |
| 6,276,547 | B1 | * | 8/2001 | Petryna | ............ B65D 21/083 220/4.03 |

(Continued)

*Primary Examiner* — Robert J Hicks
(74) *Attorney, Agent, or Firm* — Zarley Law Firm, PLC

(57) ABSTRACT

An adapter for a cooler assembly is provided that is configured to extend the capacity of a cooler assembly. The adapter includes a hollow cylinder with an outer wall, an inner wall, a top edge, and bottom edge. The hollow cylinder has a first section that is threaded on the outer wall to receive a collar of the cooler assembly. The hollow cylinder has a second section that is threaded on the inner wall to receive a body of the cooler assembly. In some arrangements of the invention, a shoulder on the outer wall is positioned between the first section and the second section. On the inner wall, a slanted section is positioned between the first section and the second section.

10 Claims, 4 Drawing Sheets

(56) References Cited

U.S. PATENT DOCUMENTS

| | | | | |
|---|---|---|---|---|
| 6,531,116 B1* | 3/2003 | Suares | .................. | A61K 8/365 |
| | | | | 424/401 |
| 9,555,949 B1* | 1/2017 | French | .................... | A47J 41/00 |
| 2012/0193366 A1* | 8/2012 | Miller | ................ | B65D 81/3879 |
| | | | | 220/592.17 |

* cited by examiner

ADAPTER FOR A COOLER ASSEMBLY

CROSS REFERENCE TO RELATED APPLICATION

This application claims the benefit of U.S. Provisional Application No. 62/507,851 filed May 18, 2017.

BACKGROUND OF THE INVENTION

The present invention is directed to an adapter for a cooler assembly and more particularly an adapter configured for use with a cooler assembly to increase the volume for larger size drinks. Cooler assemblies are well-known in the art. For example, a well-known cooler assembly for canned beverages is the Rambler Colster® sold by YETI®. The cooler assembly receives the canned beverage inside a chamber formed in the body of the cooler assembly. A collar is attached to the body to encase the canned beverage so only a limited portion of the canned beverage extends beyond the collar. In this way, the cooler assembly insulates the beverage from cooling or heating as rapidly.

While useful, the cooler assemblies are limited. For instance, many canned beverages are sold in containers larger than a 12 oz. can, such as a 16 oz., 20 oz., and 24 oz. can. It is common for an individual to purchase these varying sized containers based on a variety of factors, including thirst and access to other liquids. If a larger capacity can is placed in the cooler assembly, the top of the can will extend beyond the top of the cooler assembly by a length that makes connection between the collar and body of the cooling assembly impossible. The result is a cooling assembly that only provides for partial insulation of the canned beverage and risks spilling due to the absence of forming an enclosure around the canned beverage.

Presently, the only way of addressing this deficiency is to purchase cooling assemblies of varying sizes. This is problematic because it requires the purchase, storing, and ready access to multiple cooling assemblies, which is expensive and unnecessarily cumbersome. Thus, it is a primary objective of this invention to provide an adapter for a cooler assembly that improves upon the art.

Another objective of this invention is to provide an adapter for a cooling assembly that increases the capacity of a cooling assembly so that multiple sizes of canned beverages can be encapsulated by the cooler assembly.

Yet another objective of this invention is provide a low-cost and user friendly adapter for a cooler assembly.

These and other objectives, features, and advantages of the invention will become apparent from the specification and claims.

SUMMARY OF THE INVENTION

Figure 1:
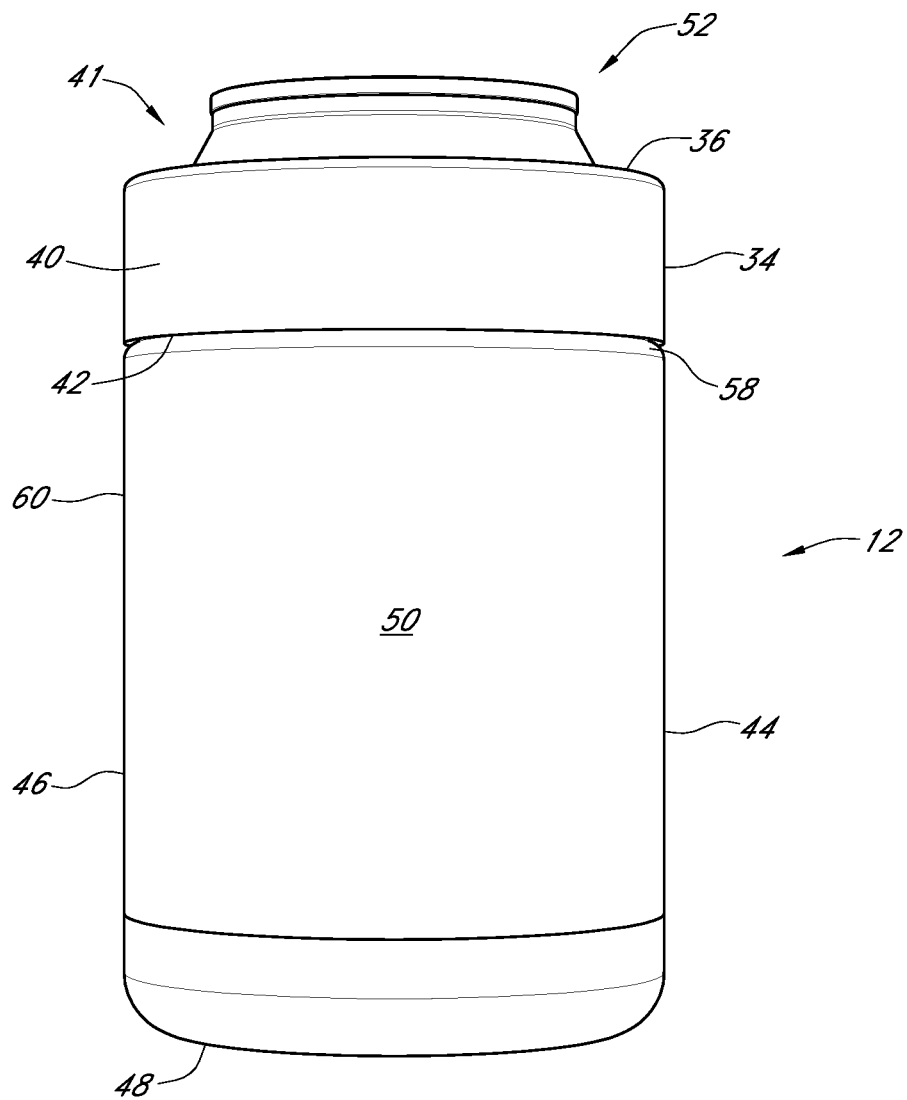
FIG. 1 is a side view of a prior art cooler assembly without an adapter.
Figure 2:
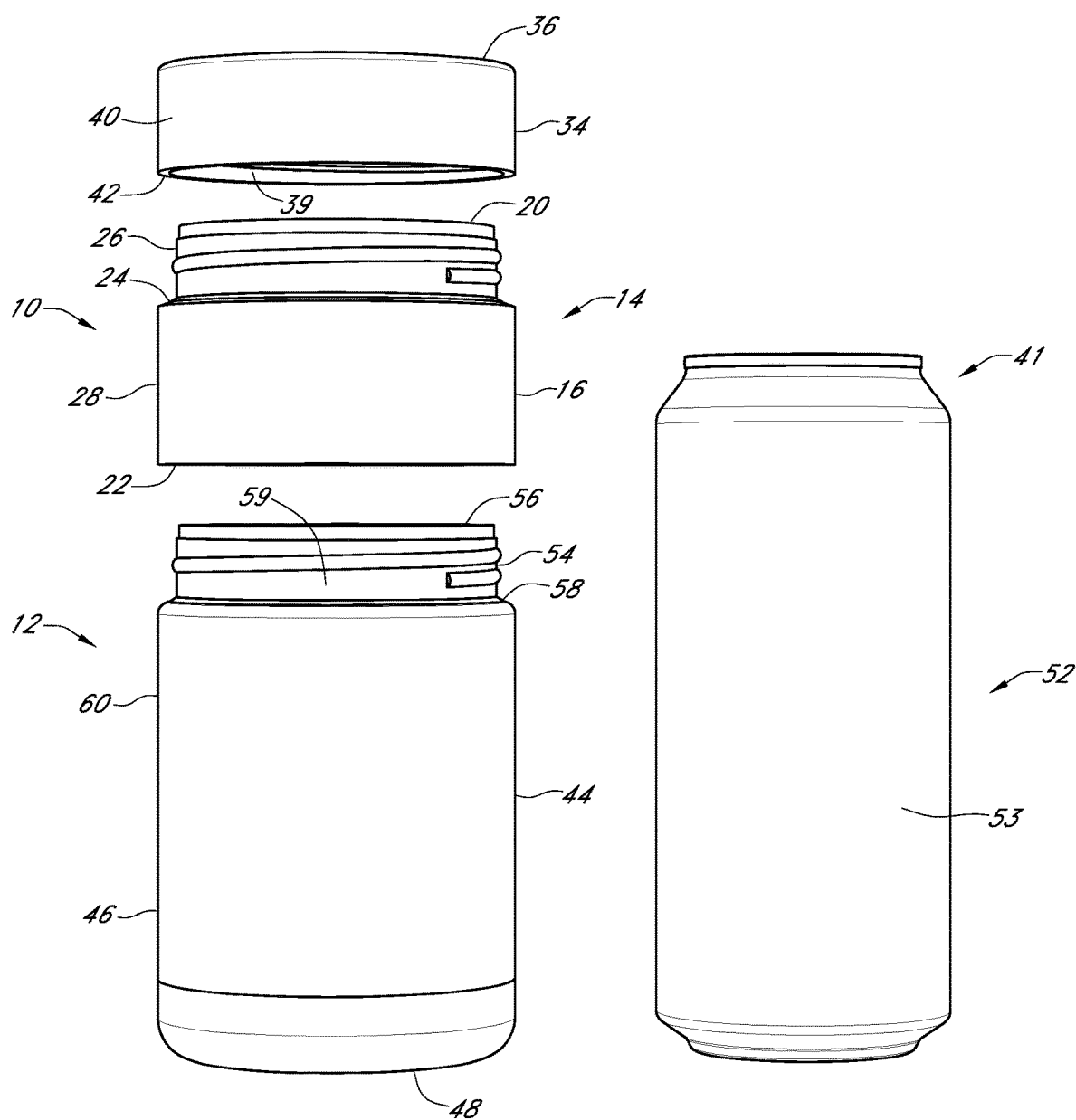
FIG. 2 is an exploded view of an adapter for a cooler assembly.
Figure 3:
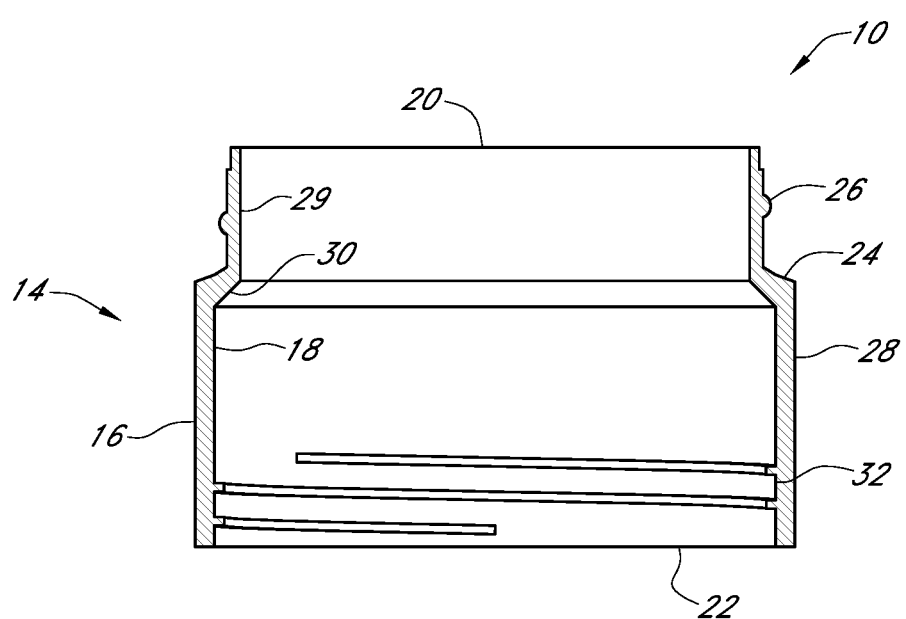
FIG. 3 is a cross-section side view of an adapter for a cooler assembly.
Figure 4:
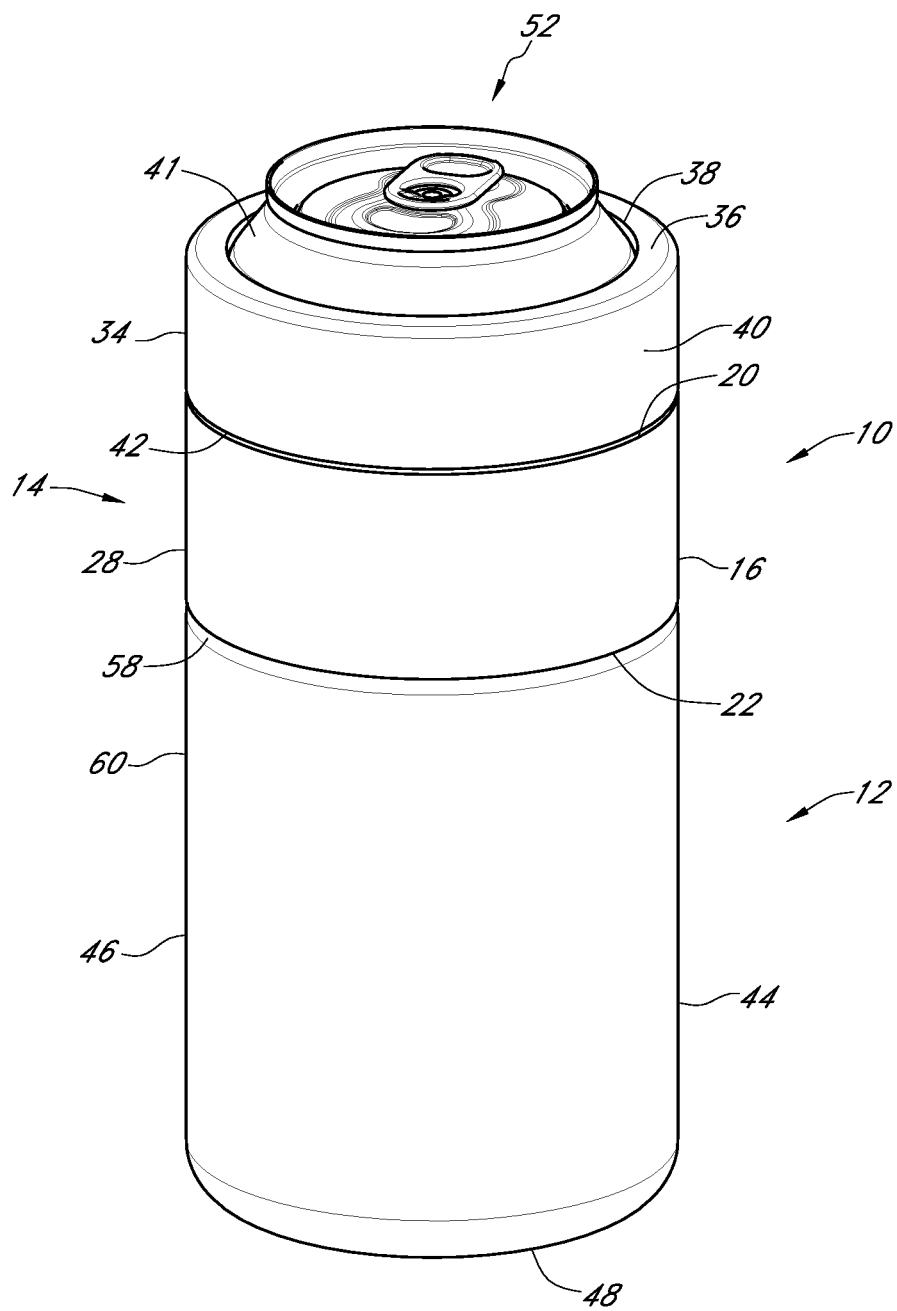
FIG. 4 is a side view of an adapter for a cooler assembly.

In general, the present invention relates to an adapter for a cooler assembly. The adapter is configured to extend the capacity of a cooler assembly. The adapter includes a hollow cylinder with an outer wall, an inner wall, a top edge, and bottom edge. The hollow cylinder has a first section that is threaded on the outer wall to receive a collar of the cooler assembly. The hollow cylinder has a second section that is threaded on the inner wall to receive a body of the cooler assembly. In some arrangements of the invention, a shoulder on the outer wall is positioned between the first section and the second section. On the inner wall, a slanted section is positioned between the first section and the second section.

DETAILED DESCRIPTION

Referring to the Figures, an adapter 10 for a cooler assembly 12 includes a hollow cylindrical member 14 having an outer wall 16, an inner wall 18, a top edge 20, and a bottom edge 22. Extending downwardly from the top edge 20 to an outwardly and downwardly extending shoulder 24, is a first section 26. In another arrangement, the shoulder 24 extends outwardly along a plane that is substantially perpendicular to the first section 26. The first section 26 is threaded on the outer wall 16. In one embodiment, the first section 26 has a smooth surface on the inner wall 18.

A second section 28 extends from the shoulder 24 to the bottom edge 22. The outer wall 18 at the second section 28 has a diameter that is greater than the outer wall 18 of the first section 26, and is textured and smooth depending on the embodiment. In some embodiments, the larger diameter of the second section 28 forms the shoulder 24 where the first section 26 and the second section 28 meet.

The inner wall 18 has a first generally vertical section 29 that extends downwardly from the top edge 20 to a slanted section 30 that extends outwardly and downwardly that increases the diameter of the inner wall 18 as the slanted section 30 extends outwardly toward the outer wall 16. In other arrangements, the slanted section 30 extends outwardly along a plane that is substantially perpendicular to the first generally vertical section 29. In some embodiments, the first generally vertical section 29 of the inner wall 18 is smooth.

A second generally vertical section 32 extends from the slanted section 30 to the bottom edge 22. In this way, the diameter of the inner wall 18 of the second generally vertical section 32 is greater than the remainder of the inner wall 18. In some embodiments, the larger diameter of the second generally vertical section 32 forms the slanted section 30 where the first generally vertical section 29 and the second generally vertical section 32 meet. In one arrangement, the slanted section 30 is positioned below the shoulder 24 and closer to the bottom edge 22. The generally vertical section 32 is threaded.

The cooler assembly 12 has a collar or gasket 34 that is cylindrical in shape and a body 44 that form a chamber 50 when connected. The collar 34 has a partial top wall 36 that surrounds an opening 38 and a sidewall 40 that extends from the top wall 36 to a bottom edge 42. The collar 34 has an interior surface 39 of the sidewall 40 and is threaded. A diameter of the interior surface 39 is substantially the same as the diameter of the outer wall 16 of the first section 26 of the adapter 10, which permits the collar 34 to be threadably connected to the first section 26 of the adapter 10. The shoulder 24, in some arrangements, conforms to the shape of the collar 24 thereby providing a superior seal between the collar 34 and the adapter 10.

The opening 38 in the top wall 34 is configured to receive a narrowed portion 41 of a canned beverage 52. As a result, only the narrowed portion 41 is capable of passing through the opening 38 and allows an individual to drink directly from the canned beverage 52 while the collar 34 is in place. The remainder of the canned beverage 52 or body 53 has a diameter that is greater than the opening 38, which prevents it from passing through the opening 38.

The body 44 of the cooler assembly 12 has a sidewall 46 and a bottom wall 48 that is configured to receive at least a portion of the body 53 of the canned beverage 52. The sidewall 46 has a top section 54 that extends from a top edge 56 to a shoulder 58 and is threaded on an outer surface 59. The shoulder 58 extends inwardly from a bottom section 60 of the sidewall 46 towards the top section 54.

A diameter of the outer surface 59 is substantially the same as the diameter of the inner wall 18 of the second section 28 of the adapter 10, which permits the body 44 of the cooler assembly to be threadably connected to the second section 28 of the adapter 10. The slanted section, in some arrangements, conforms to the shape of the shoulder 58 thereby providing a superior seal between the collar 34 and the adapter 10.

In some embodiments, the outer surface 59 of the cooler assembly body sidewall 46 has a substantially similar diameter as the outer wall 16 of the second section 28 of the adapter 10. This configuration allows for a smooth outer boundary between the body 44 and the adapter 10.

In use, the collar 34 is removed from the body 44 of the cooler assembly 12. The beverage can 52 is inserted into the body 44 of the cooler assembly 12. For example, the beverage can 52 may be of a 16 oz. variety, whereas the cooler assembly 12 is capable of only enclosing a 12 oz. beverage can 52 within the chamber 50 that is formed when the collar 34 is connected to the body 44 of the cooler assembly 12. As a result of the increased volume and size of the beverage can 52, a portion body 53 prevents the collar 34 from being capable of connecting directly to the body 44 of the cooler assembly 12.

The adapter 10 is then placed over the top of the beverage can 52 and threadably connected to the body 44. More specifically the threads on the inner wall 18 of the generally vertical section 32 of the adapter 10 are threadably mated to the threads on the outer surface of the top section 54 of the cooler assembly body 44.

Next, the collar 34 is placed over the beverage can 52 and is threadably connected to the adapter 10. More specifically, the threads on the interior surface 39 of the sidewall 40 of the collar 34 are matingly received by the threads on the outer wall 16 of the first section 26 of the adapter 10.

When fully assembled, only the narrowed portion 41 of the canned beverage 52 extends through the opening 38 of the collar 34. The remainder of the canned beverage 52 or body 53 is encased in the chamber 50 formed by the collar 34 of the cooler assembly 12, the adapter 10, and the body 44 of the cooler assembly 12. As a result, the cooler assembly 12 is capable of insulating beverage cans 52 that exceed the capacity of the cooler assembly 12 when the adapter 10 is not present.

From the above discussion and accompanying figures and claims, it will be appreciated that the adapter for a cooler assembly 10 offers many advantages over the prior art including all of the previously stated objectives. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. An adapter for a cooler assembly, comprising:
   a hollow cylinder having an outer wall, an inner wall, a top edge, and a bottom edge;
   the hollow cylinder having a first section and a second section, wherein the first section is threaded on the outer wall and configured to receive a collar of a cooling assembly; and
   wherein the second section is threaded on the inner wall and configured to receive a body of a cooling assembly wherein the collar has an opening in a top wall configured to receive a narrowed portion of a canned beverage and where only the narrowed portion of the canned beverage is capable of passing through the opening and a body of the canned beverage has a diameter greater than a diameter of the opening.

2. The adapter for a cooler assembly of claim 1 wherein the first section extends downwardly from the top edge to an outwardly and downwardly extending shoulder.

3. The adapter for a cooler assembly of claim 1 wherein the second section extends downwardly from an outwardly and downwardly extending shoulder to the bottom edge.

4. The adapter for a cooler assembly of claim 1 wherein the outer wall at the second section has a diameter that is greater than the outer wall of the first section.

5. The adapter for a cooler assembly of claim 1 further comprising the inner wall having a first generally vertical section that extends downwardly from a top edge to a slanted section that extends outwardly and downwardly towards the outer wall.

6. The adapter for a cooler assembly of claim 5 further comprising the inner wall having a second generally vertical section that extends downwardly from a slanted section that extends outwardly and downwardly towards the outer wall to the bottom edge.

7. The adapter for a cooler assembly of claim 1 wherein the inner wall at the second section has a diameter that is greater than a diameter of the inner wall at the first section.

8. An adapter for a cooler assembly, comprising:
   a hollow cylinder having an outer wall, an inner wall, a top edge, and a bottom edge;
   the outer wall having a first section and a second section, wherein the first section is threaded on the outer wall and configured to receive a collar of a cooling assembly; and
   the inner wall having a first generally vertical section and a second generally vertical section, wherein the second generally vertical section is threaded on the inner wall and configured to receive a body of a cooling assembly wherein the collar has an opening in a top wall configured to receive a narrowed portion of a canned beverage and where only the narrowed portion of the canned beverage is capable of passing through the opening and a body of the canned beverage has a diameter greater than a diameter of the opening.

9. The adapter of claim 8 wherein the first section extends from the top edge to a shoulder, and the second section extends from the shoulder to the bottom edge.

10. The adapter of claim 8 wherein the first generally vertical section extends from the top edge to a slanted portion, and the second generally vertical section extends from the slanted section to the bottom edge.

\* \* \* \* \*